United States Patent [19]

Molotsky et al.

[11] 3,957,702

[45] May 18, 1976

[54] FLAME RETARDANT POLYURETHANE FOAMS

[75] Inventors: Hyman Max Molotsky, Chicago, Ill.; Robert Eugene Gramera, Denver, Colo.

[73] Assignee: CPC International Inc., Englewood Cliffs, N.J.

[22] Filed: Sept. 8, 1971

[21] Appl. No.: 178,796

Related U.S. Application Data

[63] Continuation-in-part of Ser. No. 637,364, May 10, 1967, abandoned.

[52] U.S. Cl. .................. 260/2.5 AR; 260/2.5 AS; 260/77.5 AR; 260/77.5 AS
[51] Int. Cl.² ................. C08G 18/50; C08G 18/14
[58] Field of Search ............... 260/2.5 AR, 2.5 AS, 260/77.5 AR, 77.5 AS

[56] References Cited
UNITED STATES PATENTS

| | | | |
|---|---|---|---|
| 3,165,508 | 1/1965 | Otey et al. | 260/210 |
| 3,277,213 | 10/1966 | Fuzesi | 260/233.3 |
| 3,399,190 | 8/1968 | Fuzesi et al. | 260/233.3 |
| 3,402,170 | 9/1968 | Fuzesi et al. | 260/233.3 |
| 3,541,034 | 11/1970 | Fuzesi et al. | 260/2.5 |
| 3,600,338 | 8/1971 | Molotsky | 260/2.5 AS |
| 3,655,590 | 4/1972 | Moss et al. | 260/2.5 AS |
| 3,674,717 | 7/1972 | Fuzesi et al. | 260/2.5 AS |

*Primary Examiner*—H. S. Cockeram
*Attorney, Agent, or Firm*—Albert P. Halluin

[57] ABSTRACT

Polyurethane foams and their method of preparation, more specifically, polyurethane foams derived from the reaction of organic polyisocyanates and starch polyethers or starch polyether hydrolysates which contain chemically bound phosphorus.

10 Claims, No Drawings

FLAME RETARDANT POLYURETHANE FOAMS

This application is a continuation-in-part of copending application Ser. No. 637,364, filed May 10, 1967, now abandoned.

Foamed polyurethane resins are formed by reacting a polyhydroxy compound with an organic compound containing a plurality of isocyanate radicals. The hydroxy groups and the isocyanate groups react to provide polyurethane linkages which cross-link the molecules to provide a solid resin structure. Ofttimes a gas-producing agent is employed in the formation of such resins and through its action the resin before solidifying is converted to a cellular or foam-like state. This state is permanently retained when the mixture is reacted to a sufficiently advanced state to provide a solid material. Under optimum conditions, it is possible to provide cellular or foam structures of fine, uniform cell structure. These materials have many applications, for example, as cushioning materials, as insulating materials against the transmission of sound and heat, and for various other purposes.

A serious drawback to use of these materials resides in the fact that they have relatively poor resistance to flame. Often a slab or other body of foam material, when once ignited, will continue to burn without further application of flame until it is completely consumed. Certain fire retardant agencies have been proposed to reduce the flammability of the polyurethane resin foams. However, while addition of such materials does improve resistance of the polyurethane foam to flame, often, to achieve such effect, large amounts of these additives are required. This presents problems in the foam production, and particularly may result in stratification or separation of foam.

Again, such additives often impair the strength of the foam, or result in a loss of other desired physical properties, such as compression set, and elongation and load bearing properties. Incorporation of flame proofing additives which tend to be hygroscopic in a urethane foam often increases the moisture absorption of the foam, thus resulting in poor aging characteristics. Similarly, use of many flame proofing additives upsets the delicate surface chemistry of the foaming system and leads to severe destruction of internal cell structures, formation of a coarse cell structure and/or collapse of the foam. Also, unless the flame proofing additive is carefully chemically and physically tailored, particularly with respect to compatibility with the urethane resin, a problem of proper additive distribution at the gas-solid interfacial surface occurs.

Lastly, while many urethane foams are made flame-retardant by application of one or more additives, thereby making the foam self-extinguishing after the flame is removed, in some cases, as long as the flame is in contact with the foam, burning droplets of melted foam will fall, which may start other smaller fires as they drop to the surrounding areas. It is rather desired that the flame retardant polyurethane foam form a non-burning charcoal on its surface, when coming in contact with a flame, instead of exhibiting this melting and dripping phenomenon.

In view of the above it is, therefore, an object of the invention to provide a novel flame-retardant urethane resin suitable for manufacture of cellular urethane foams.

A specific object of the invention is to provide the above flame retardant urethane foam without sacrifice of other desired properties such as compression strength and requisite foam density.

A still further object of the invention is to provide a novel flame-retardant urethane foam which can be easily and simply prepared without resort to special and costly manipulative techniques.

Other objects will appear hereinafter.

BRIEF SUMMARY

In accordance with the invention, novel polyurethane resins have been discovered that are eminently useful in preparing flame-retardant polyurethane foams. Broadly speaking, the polyurethane foams, which are self-extinguishing and possess a high degree of flame resistance, are prepared by mixing together a polyisocyanate and a phosphorus-containing starch product. The starch material, into which phosphorus is introduced to produce the phosphorus-containing starch product, may be a starch polyether or a starch polyether hydrolysate. The urethane polymer network is built up from the above resin system and thereafter the foam reaction is developed. The resin mixture is generally foamed in the presence of a catalyst by means of a blowing agent or via internal development of carbon dioxide. The foam network formation can take place substantially simultaneously, as in the one-shot method, or in more or less distinct steps as in the prepolymer and semi-prepolymer techniques, more fully described hereinafter.

At the outset, phosphorus derivatives of starch polyethers or starch polyether hydrolysates are initially formed. Generally, sufficient phosphorus is introduced into the starch products so that the reacted product analyzes as 1–10% phosphorus, expressed as P. More often, a useful product analyzes 2–8% phosphorus, expressed as P.

Introduction of phosphorus into the starch polyether molecule is generally easily effected, such as by reaction of the starch materials with a polyphosphoric acid, followed by neutralization of the phosphated product. This reaction will be described in more detail hereinafter.

After formation of the phosphorus-containing starch polyether products, all that remains is to simply mix one or more of these phosphorus-starch derivatives with one or more organic polyisocyanates, foam the reaction mixture or partially reacted product in presence of a foaming agent, and cure the foamed product.

The amount of phosphorus-containing starch product in relation to polyisocyanate reactant may vary over a wide range depending upon type of starch product used, specific organic polyisocyanate employed, desired predominance of one special foam property, etc. Usually, excellent foams may be prepared by reacting 1–3 parts by weight of phosphorus-containing starch product with 1–3 parts by weight of organic polyisocyanate.

GENERAL DESCRIPTION

The Starch Material

The basic material used in preparing the phosphorus-containing derivatives, which impart flame resistance to the polyurethane foam, is, of course, starch itself. The starting starch material that may be used in practicing the invention may be derived from any vegetable source, such as, for example, corn, wheat, potato, tapioca, rice, sago and grain sorghum. Waxy starches may also be used. The term "starch" is used broadly herein and encompasses unmodified starch and tailings, and, as well, starch that has been somewhat modified by treatment with acids, alkalies, enzymes, or oxidizing agents. Soluble or partially soluble modified starches, dextrins, pregelatinized products, and starch derivatives are also suitable here.

Preferred starches have a molecular weight of at least 5,000, more preferably at least 10,000, and most preferably at least 100,000. If the starting starch material is already derivatized in some manner, it is nevertheless useful as long as the product is still essentially amylaceous in nature and still contains reactive hydroxy groups. For example, the starting starch material may contain anionic or non-ionic groups, and may thereafter be reacted with phosphorus oxyacids or condensed materials of this type.

With respect to the starch polyether hydrolysates, the starch may be first derivatized by introduction therein of polyether groups by known alkoxylating techniques, thereafter reacted with the acid phosphorus material, and then hydrolyzed. In another embodiment, the starch polyether may be first formed, partially hydrolyzed, and then phosphorus introduced into the hydrolyzed starch polyether. The starch polyethers herein may be hydrolyzed by heating with an aqueous mineral acid, such as hydrochloric acid, until the desired degree of hydrolysis is attained. The ether groups remain intact, i.e. they are not affected by these conditions of hydrolysis of the glucoside linkages. The starch polyether hydrolysates herein contain at least 10 anhydroglucose units. Greatly preferred for use in the instant invention is a phosphorus-containing starch polyether. Maximum benefits are achieved through use of this material in retarding flammability of subsequently formed polyurethane foams. Likewise, this material in no way detrimentally affects other desired foam properties such as strength and required low density.

The starch polyethers are conventionally prepared by reacting starch with an alkoxylating agent such as ethylene oxide, propylene oxide, butylene oxide, or mixtures of any of the foregoing in the presence of a basic catalyst.

Preferred starch polyethers, useful as materials into which phosphorus may be introduced, are characterized by the following general formula, in which x stands for the number of repeating anhydroglucose units in the starch molecule:

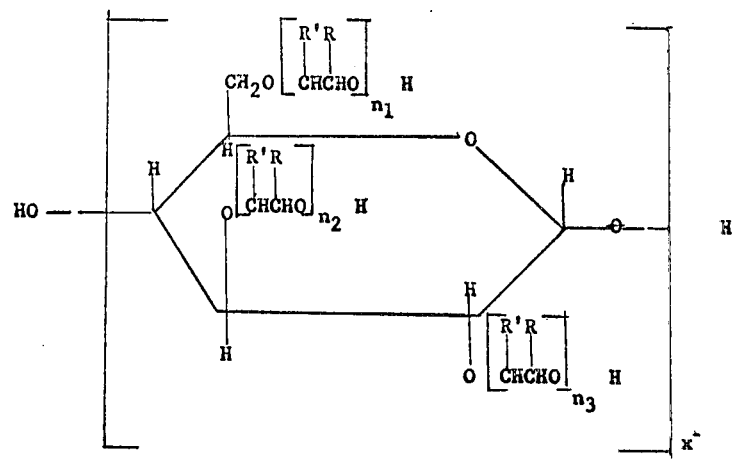

where R and R' can be different or the same, and may be H, $CH_3$, $C_2H_5$, $C_3H_7$, $CH_2CH_2Cl$, $CH_2CH_2Br$, $CH_2OH$, $CH=CH_2$, and aryl groups; and where $n_1$, $n_2$, and $n_3$ are whole numbers from 0 up to about 50, and the average of the sum of $n_1$, $n_2$, and $n_3$ is in the range of from about 3.5–50. Unhydrolyzed starch polyethers generally have as few as 100 to as many as several thousand repeating anhydroglucose units, while hydrolyzed materials may have as few as about 10 units.

The starch polyethers may also be represented by the following formula:

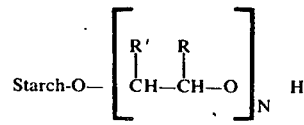

where N has a value in the range from about 3.5 to about 50, per average anhydroglucose unit, and R' and R are as set forth above.

As is known, the anhydroglucose unit, which is present in the starch, may have various degrees of substitution (D.S.) of from less than one up to the maximum level of three. According to present beliefs in the art, the hydroxyl in the 6 position in any anhydroglucose unit is the most reactive. Further, the hydroxyl at the 2 position is believed to be the next most reactive, and the hydroxyl at the 3 position is believed to be the least reactive. The present belief of the art further supposes that the 6 position hydroxyls in the anhydroglucose units will undergo a more extensive substitution or addition than the hydroxyls at the 2 and 3 positions, but it may be otherwise. Irrespective of the actual sequence or the number of anhydroglucose units involved, the general formula immediately above is intended to represent the products of this invention wherein the ether substitution may occur to various degrees of substitution at all or less than all of the anhydroglucose units in the starch. In the formula immediately above, the group within the bracket may be repeatedly added to obtain the various polyether products of this invention, where N is a number of from about 3.5 to about 50. This concept of molar substitution (M.S.) conveniently expresses the moles of alkylene oxide that are added to the average anhydroglucose unit in the starch. A number that is fractional reflects the fact that the M.S. is a statistical average.

The preferred lower aliphatic alkylene oxides employed in preparing the above polyether are ethylene oxide or propylene oxide, although other alkylene oxides containing 2 to 5 carbon atoms can be employed, such as, for example, butylene oxide, amylene oxide, epihalohydrin (halopropylene oxide), glycidol (hydroxypropylene oxide) and its derivatives, butadiene monoxide, and the like, and any mixtures of the above compounds. Other oxides suitable for the invention are aromatic oxides, such as styrene oxides and derivatives thereof.

The alkoxylating reaction is base catalyzed. Potassium hydroxide is the preferred catalyst; however, basic amine catalysts could be used as well as other basic hydroxides, such as sodium hydroxide or calcium hydroxide. The amount of alkaline catalyst generally ranges from 1% to 7% based on the weight of starch.

The amount of etherifying agent used depends primarily upon the moles of alkylene oxide desired per anhydroglucose unit in the final product. Sufficient alkylene oxide should be used to produce polyethers having an M.S. (moles of alkylene oxide per anhydroglucose unit) of from about 3.5 to about 50 or more. Usually the approach of the end point of a reaction is indicated by a decrease in the pressure within the reaction vessel.

THE INTRODUCTION OF PHOSPHORUS

After preparing the above described starch polyethers, these materials may be partially hydrolyzed and then phosphorus may be introduced into the molecule. Likewise, the starch polyethers may be first reacted with phosphorus oxyacid compounds, and thereafter partially hydrolyzed.

The reaction of the foregoing starch polyether compounds with a phosphorus-reactant is carried out in a conventional manner. Usually, enough phosphorus reactant should be employed to introduce into the starch molecule the requisite amount of phosphorus as expressed above. In most instances, in this reaction, phosphate esters are produced from the starch polyether.

The reaction is exothermic so that, in many instances, it is neither necessary or desirable to heat the reaction mixture externally. The reaction may be carried out at temperatures within the range of from about 0°C to about 150°C.

Usually, though not always, there also occurs during introduction of phosphorus into the starch molecule, a certain degree of depolymerization of the starch. That is, the starch is also hydrolyzed to smaller units on the average. This reaction is technically referred to as phosphorylation. The phosphorylated starches, starch polyethers or starch polyether hydrolysates are excellent products for use in the invention, and the occurrence of some break-down of the starch molecule in no way interferes with the properties of polyurethane resins made from these materials.

In a preferred embodiment the phosphorus-containing intermediate is prepared by the reaction of the inorganic phosphoric acid with a starch polyether (or hydrolysate thereof) which has been prepared by the reaction of starch, urea and an alkylene oxide having from 2 to 5 carbon atoms in the alkylene group. Polyurethane resins prepared from such phosphorus-containing intermediates are especially effective flame-retardant materials. The amount of urea used in this instance is such as to impart from about 1.0 to about 5.0% nitrogen to the starch material.

Typical phosphorus compounds which are chemically adapted to react with the hydroxyl groups contained in the starch or starch polyether materials can be selected from a wide variety of materials. Among these are phosphoric acid, phosphorous acid, metaphosphoric acid, pyrophosphoric acid, hypophosphoric acid, polyphosphoric acid, oxides of phosphorous, such as $P_2O_5$, $P_2O_4$ and $P_2O_3$, and phosphorous oxyhalides such as phosphorous oxychloride, halides of phosphorous such as $PCl_3$, $PCl_5$, $PBr_3$, and $PBr_5$. Greatly preferred are polyphosphoric acids of high $P_2O_5$ content.

NEUTRALIZATION BEFORE REACTION OF THE PHOSPHORUS-CONTAINING STARCH PRODUCT WITH POLYISOCYANATE

After effecting the above phosphorus-introducing reaction, the resultant products may be used without further modification of combination with the polyisocyanate reactant to form useful foams. However, it has been found that greatly preferred foams having improved properties are formed by first neutralizing the phosphorus-containing starch product. The term "neutralizing" is used herein to denote the reaction of the phosphorus-containing starch polyethers or phosphorus-containing starch polyether hydrolysates with an alkylene oxide so as to destroy the acidity of the starch material. The alkylene oxides contemplated are those having from 2 to 5 carbon atoms. It is believed that they react with P—OH groups in such neutralization reaction. Only so much of the alkylene oxide should be used as is necessary to react with all of these P—OH groups, although the use of an excess does not have significantly adverse effects, nor does the use of slightly less than the stoichiometric quantity. Inorganic neutralizing agents should not be employed due to their tendency to introduce ash components into the foam.

Also, stabilizers such as nitrogen containing materials, viz. urea, amines, amino alcohols and like materials may also be employed. Ethanol amine is a specific example of such a stabilizer. These materials act as acid scavengers and are added after neutralization to combat a drop in pH which would tend to decompose the phosphorus starch product. Usually, they are present in an amount of about 0.1 to about 5.0% based on the starch derivative.

Greatly preferred phosphorus-containing starch products are neutralized phosphorus-containing starch polyether materials wherein the phosphated starch polyether is neutralized with ethylene oxide, propylene oxide, butylene oxide or mixtures of these. The following formula represents typical members of this group which may be utilized in the invention:

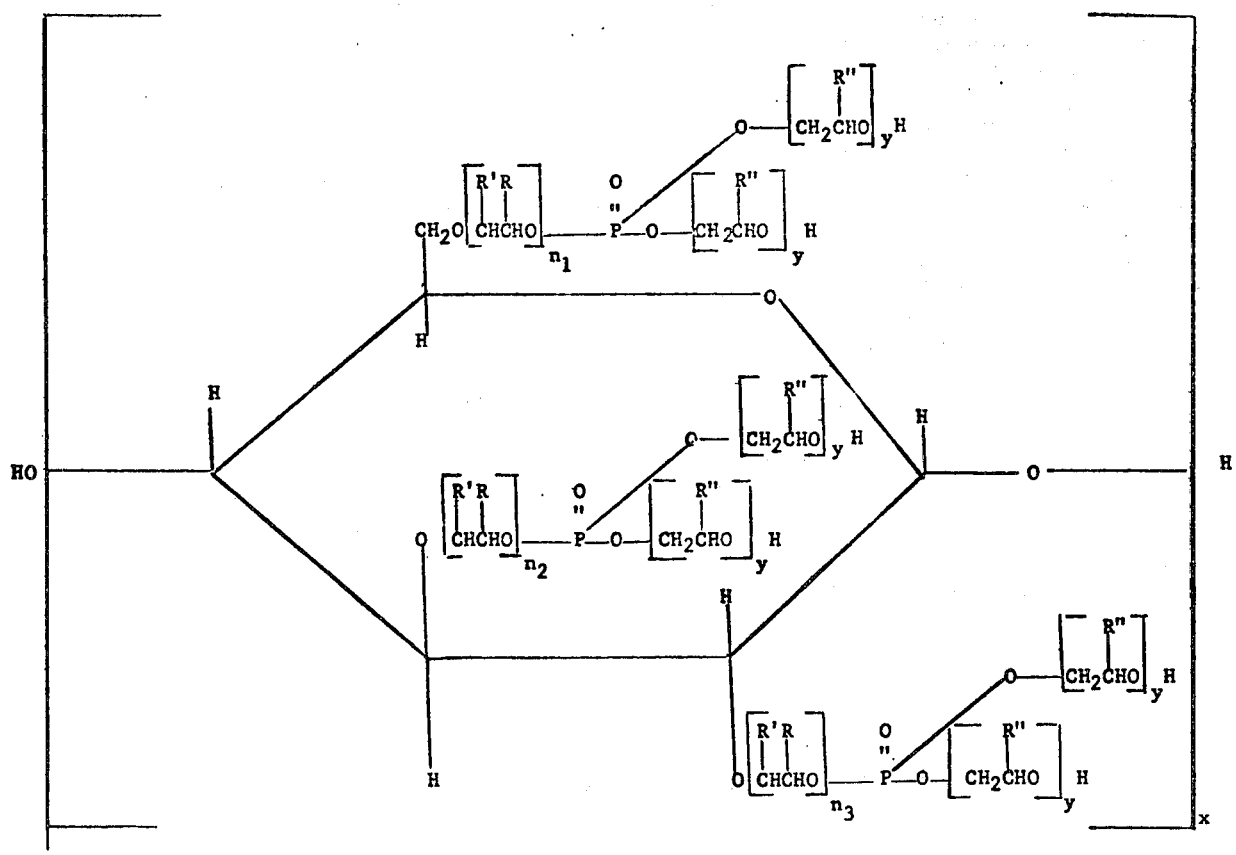

where R, R', $n_1$, $n_2$, $n_3$, and $x$ are as previously defined, $y$ is an average number from one-half to five or more, and usually is from ½ to 2, and R'' represents a radical selected from among hydrogen, methyl, and ethyl, and is preferably methyl or ethyl.

In the neutralization reaction, useful products may be only partially neutralized, or sufficient alkylene oxide may be added whereby repeating ether units may be formed as linkages to the phosphorus nuclei present. This accounts for the fact that $y$ may be less than one as an average in a partial neutralization, or greater than one, when more alkylene oxide is added than that needed to neutralize the acid phosphorus starch polyether. In the more typical case $y$ is about one, say, from ½ to 2. During the neutralization, of course, free phosphorus compounds not bound to starch may also be neutralized.

OTHER COMPONENTS

In forming the resin mixtures of the invention, it should be understood that other ingredients beside the above described phosphorus-containing starch products and polyisocyanates may be present. These are aliphatic polyols. Particularly preferred are starch, starch polyethers of the type described above, and other carbohydrate polyethers. For example, useful in the invention are ethylene propylene or butylene oxide adducts of monoacetone glucose, diacetone glucose, dextrose, corn syrup, glycosides such as butyl glucoside and methyl glucoside, and propylene glycol glucoside, starch, starch hydrolysis products, sucrose, maltose, high maltose syrups, cyclodextrin, etc. Other polyols such as glycerin and glycols may also be employed. Amounts of these may be employed up to 25%, or even as high as 75% or more based on total polyol used in preparation of the foam. Particularly preferred here are polyethers of methyl glucoside, butyl glucoside, sucrose and propylene glycol glucoside having from 1 to about 10 ether groups, prepared by alkoxylation of the particular glucoside or sucrose with an alkylene oxide having 2–5 carbon atoms in the alkylene group.

THE POLYISOCYANATES

Suitable polyisocyanates which may be conveniently reacted with the above derivatives are those which have no other reactive functional groups, i.e. reactive under the conditions of reaction with the starch polyethers or starch polyether hydrolysates. The following are typical members of this class; toluene diisocyanate, diphenyl diisocyanate, triphenyl diisocyanate, naphthalene diisocyanate, chlorophenyl-2,4-diisocyanate, ethylene diisocyanate, 1,4-tetramethylene diisocyanate, paraphenylene diisocyanate, hexamethylene diisocyanate, 3,3'-dimethyl-4,4'-biphenylene diisocyanate, 3,3'-dimethoxy-4,4'-biphenylene diisocyanate, diphenylmethane-4,4'-diisocyanate, etc. Mixtures of two or more of these isocyanates are contemplated. In general, alkylene diisocyanates wherein the alkylene group contains 2–6 carbon atoms, aromatic hydrocarbon di- or tri-isocyanates and polymethylene polyphenyl polyisocyanates are contemplated. The structure of the latter is illustrated as follows:

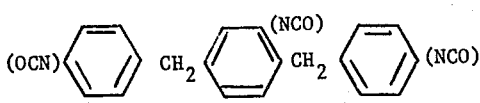

The precise location of the isocyanate groups is not clearly established, but is believed to be ortho and/or para with respect to the methylene groups. These are prepared by phosgenation (with phosgene) of an aniline-formaldehyde reaction product.

Polyisocyanates containing more than two isocyanate groups may also be used. Illustrative of these are polymethylene polyphenyl isocyanate, such as dimethylene triphenyl triisocyanate. A commercially available polyisocyanate is known as PAPI and has an average functionality between two and three. Thus, by the term "polyisocyanate" is meant a molecule containing two or more isocyanate groups.

FOAM PREPARATION

The preparation of the urethane foams may be carried out in a variety of techniques. For example, a prepolymer may be prepared by reacting the phosphorus-containing starch product and polyisocyanate in the absence of water, and thereafter a foam may be produced by the addition of excess isocyanate, catalyst, and surfactant. Water may also be added to make flexible foams.

In another method known as the one-shot method, the starch derivative, blowing agent, and isocyanate reactants are simultaneously mixed together and allowed to react in the presence of a catalyst.

In what is known as the semi-prepolymer technique, the phosphorus-containing starch reactant is partially extended with excess isocyanate to provide a reaction product containing a high percentage of free isocyanate groups, which is then foamed at a later stage by reaction with additional starch product, blowing agent and catalyst. The starch derivative containing excess isocyanate may also be moisture cured.

The foaming reaction itself can be carried out by preforming the foam by means of isocyanate and water to form carbon dioxide. Again, foaming can also be effected by means of a blowing agent, such as a low boiling, high molecular weight gas, which vaporizes at or below the temperature of the foaming mass. Preferred blowing agents are the fluorocarbons, such as trichloromonofluoromethane, dichlorodifluoromethane, dichlorofluoromethane, 1,1-dichloro-1-fluoroethane, 1-chloro-1,1-difluoro-2,2-dichloroethane, and 1,1,1-trifluoro, 2-chloro-2-fluoro, 3,3-difluoro, 4,4,4-trifluorobutane.

A further method of forming cellular structrues in polyurethane resins comprises mechanically whipping an emulsion of the liquid interpolymerizable components under appropriate conditions.

In additon to the main components, namely the phosphorus-containing starch product and the organic polyisocyanate, the foamable mixture usually contains curing agents. Typical of these are tertiary amines, such as tetramethyl guanidine, tetramethyl-1,3-butanediamine (DMBDA), triethylenediamine (DABCO), dimethylethanolamine, and tin esters such as stannous oleate, stannous octoate, and dibutyl tindilaurate, etc. The amount of catalyst or curing agent usually varies in a range from about 0.1% to about 5% by weight based upon the reactive components in the foamable mixture.

Other auxiliary agents may also be present which are useful in preparing excellent flame resistant foams. For example, surfactants may be utilized which are designed to assist in the maintenance of the cell structure of the foam while it is still soft and uncured. Typical of these are the so-called "Pluronics", marketed by Wyandotte Chemical, which are condensates of ethylene oxide with a hydrophobic base which has been formed by condensing propylene oxide with propylene glycol. Another class of useful surfactants comprises the so-called "Tetronics", marketed by Wyandotte Chemical, which are formed by the addition of propylene oxide to ethylenediamine, followed by the addition of ethylene oxide. Yet another valuable class of surfactants comprises the so-called "Tweens", marketed by Atlas. These are monoesters of higher fatty acids, such as stearic acid, etc., and polyoxethylene sorbitan. Still other useful surfactants include silicone derivatives.

The following examples illustrate typical preparations of phosphorus-containing starch products. All parts and percentages hereafter are by weight, unless expressed otherwise.

EXAMPLE I

A solution of 460 g. of propoxylated starch, having a hydroxyl number of 363, in 200 ml. of benzene was stirred while 167 g. of polyphosphoric acid was added portionwise throughout a period of one hour. The mixture then was heated to reflux temperature and 486 ml. (418 g.) of propylene oxide added portionwise throughout a period of three hours. When all had been added the mixture was freed of solvent and unreacted propylene oxide by stripping at 70°C at reduced pressure. The residual phosphorus-containing starch polyether contained 4.2% phosphorus and had a hydroxyl number of 303. It was stabilized by the addition of 0.2%, based on the stabilized composition, of ethanol amine.

EXAMPLE II

In a moisture-free, 3-neck flask fitted with a power stirrer and reflux condenser, 200 g. of propoxylated starch, having a hydroxyl number of 363, was dissolved in 150 ml. of dioxane. While stirring, 100 g. of polyphosphoric acid was slowly added over a 45-minute period. Reaction temperature was increased and maintained at 110°C for 10 hours. The reaction was cooled and kept between 45°–50°C while 330 ml. of propylene oxide was added over a period of 2 hours to neutralize the product. Thereafter, solvent and residual propylene oxide were stripped from the product under vacuum at around 70°C. The phosphorus-containing starch polyether contained 6.7% phosphorus and had a hydroxyl number of 347.

EXAMPLE III

A solution of 3000 g. of propoxylated starch, having a hydroxyl number of 363, in 2000 g. (1942 ml.) of dioxane was stirred for 3.5 hours while 1650 g. of polyphosphoric acid was added portionwise. The resulting mixture was heated at reflux temperature for an additional four hours and then treated with 6980 g. of propylene oxide at 70°–85°C for 4 days. Volatile materials were removed as above leaving a phosphorus-containing starch polyether having 6.8% phosphorus and a hydroxyl number of 314.

EXAMPLE IV

A mixture of 2650 g. of a propoxylated corn starch, having a hydroxyl number of 363 (corresponding to an M.S. of 5.2), and 8000 ml. of 1.0N hydrochloric acid was heated at reflux temperature for 42 hours, then treated successively with activated carbon and an anion exchange resin (to remove chloride ion), then concentrated to a viscous syrup. It had a hydroxyl number of 516.

EXAMPLE V

To 516 g. of the starch polyether hydrolysate prepared as in Example IV there was added portionwise over a period of 100 minutes 250 g. of polyphosphoric acid. The resulting mixture was heated at 50°C for two hours, treated portionwise over a period of 4¾ hours with 1000 g. of propylene oxide, then with 0.2% of ethanolamine. The phosphorus-containing starch polyether hydrolysate had a phosphorus content of 5.6% and a hydroxyl number of 328.

EXAMPLE VI

A starch-urea-polyether product was prepared by mixing 186 g. of starch having a fluidity of 80, 60 g. of urea, and 13.0 g. of 50% aqueous potassium hydroxide and adding propylene oxide at 100 psi and 250°–270°F. The reaction was allowed to proceed for 4.5 hours under these conditions whereupon the product mixture was neutralized with tartaric acid, stripped to remove volatile components and filtered. The product contained 0.1% $H_2O$, 0.05% ash, 2.3% nitrogen and a hydroxyl number of 463.

In the next phase of work, foams were prepared by reacting the phosphorus-containing products of the above examples with different polyisocyanates. Different catalysts were also used to demonstrate the versatility of the method of the invention. A fluorocarbon was used as a blowing agent.

The prepared foams were then subjected to a burning or flame retardancy test. This is a standard ASTM test designated as ASTM D-1692-59T. In this flame retardancy test, the designation S.E. means self extinguising, and the term N.B. designates the sample as non-burning. The cured foams were also measured for density and compression strength.

The term PAPI designates polymethylene polyphenyl isocyanate having an average isocyanate group content of 2.3 per molecule. TDI represents toluene diisocyanate. Results of these tests are given below in Table I.

TABLE I

| Starch Product of Ex. Number | Starch Product Weight-g. | Type polyisocyanate & Weight-g. | Density-lbs/ft.$^3$ | Parallel Compression Strength-lbs. | Flame Retardancy | |
|---|---|---|---|---|---|---|
| | | | | | Class | Extent of Burning-inches |
| I | 100 | PAPI-76.6 | 2.88 | 22 | S.E. | 1-9/16 |
| II | 100 | PAPI-87.8 | 2.46 | 48 | N.B. | 15/16 |
| II | 100 | PAPI-87.8 | 2.27 | 39 | N.B. | 15/16 |
| III | 100 | PAPI-79.4 | 1.99 | 30 | S.E. | 1-3/16 |
| V | 100 | PAPI-83.0 | 2.22 | 32 | S.E. | 1-1/4 |
| 50 parts III + 50 parts methyl glucoside polyether (propylene oxide adducts Hydroxyl No. -431 | 100 | PAPI-109 | 2.53 | 43 | S.E. | 1 |
| I | 100 | TDI-49.5 | 2.16 | — | S.E. | 2.0 |

In addition to possessing excellent flame-resistance or flame retardancy, the urethane foams of the invention did not achieve the same while losing other valuable properties. In particular, tensile strength, compression set, elongation and load bearing properties and other desired physical properties were maintained. Moreover, proper internal cell structure of a fine nature was achieved, and no collapse of the foam was noted. The phosphorus-containing starch products had excellent compatiblity with the organic polyisocyanates, and thus there was no problem of proper distribution in the foam. It was also noted that there was little or no afterglow of the foams subjected to flaming, and a uniform non-burning charcoal was maintained on the surface of the foam when burned, which did not melt or drip when it came in contact with the flame.

It is believed that the phosphorus-containing starch polyether derivatives as previously described are also novel per se. This includes both the phosphorus compounds derived from the starch polyethers and hydrolysis products thereof.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. A polyurethane resin comprising the reaction product of an organic di- or tri-isocyanate having no other reactive functional groups and a phosphorus-containing intermediate which is prepared by reacting an inorganic phosphoric acid with a starch polyether which is in turn prepared by the reaction of starch with an alkylene oxide of 2–5 carbon atoms, said starch polyether having an average of from about 3.5 to about 50 alkylene oxide units per anhydroglucose unit, or hydrolysate thereof having at least about 10 anhydroglucose units.

2. The polyurethane resin of claim 1 wherein the inorganic phosphoric acid is a polyphosphoric acid.

3. The polyurethane resin of claim 1 wherein the alkylene oxide is propylene oxide.

4. The polyurethane resin of claim 1 wherein the starch is corn starch.

5. The polyurethane resin of claim 1 wherein the phosphorus-containing starch polyether or phosphorus-containing starch polyether hydrolysate has a phosphorus content of 1–10%.

6. The polyurethane resin of claim 1 wherein the inorganic phosphoric acid is reacted with a starch polyether hydrolysate.

7. The polyurethane resin of claim 6 wherein the starch polyether hydrolysate is prepared by the hydrochloric acid hydrolysis of a starch polyether.

8. The polyurethane resin of claim 1 wherein the phosphorus-containing intermediate, prior to reaction with the organic di- or tri-isocyanate, is reacted with an alkylene oxide having from 2 to 5 carbon atoms in the alkylene group.

9. A polyurethane resin comprising the reaction product of (A) an organic diisocyanate or tri-isocyanate having no other reactive functional groups, (B) a phosphorus-containing intermediate which is prepared by reacting an inorganic phosphoric acid with a starch polyether which is in turn prepared by the reaction of starch with an alkylene oxide of 2–5 carbon atoms said starch polyether having an average of from about 3.5 to about 50 alkylene oxide units per anhydroglucose unit, or a hydrolysate thereof having at least about 10 anhydroglucose units, and (C) a polyether of a lower alkyl or lower alkylene glucoside, or a polyether of sucrose.

10. A polyurethane resin comprising the reaction product of an organic diisocyanate or triisocyanate having no other reactive functional groups and a phosphorus-containing intermediate prepared by reacting (1) an inorganic phosphoric acid with (2) a starch polyether which is in turn prepared by the reaction of starch with an alkylene oxide of 2–5 carbon atoms, said starch polyether having an average of from about 3.5 to about 50 alkylene oxide units per anhydroglucose unit, or a hydrolysate thereof having at least about 10 anhydroglucose units, and (3) urea.

* * * * *